United States Patent [19]

Nennecker

[11] Patent Number: 5,498,151
[45] Date of Patent: Mar. 12, 1996

[54] MIXING HEAD FOR MOLDING MACHINE

[76] Inventor: Gunter H. Nennecker, 358 Smith Dr., Tallmadge, Ohio 44278

[21] Appl. No.: 322,693

[22] Filed: Oct. 13, 1994

Related U.S. Application Data

[63] Continuation-in-part of Ser. No. 57,313, May 5, 1993, abandoned.

[51] Int. Cl.⁶ .......................... B29C 44/02; B29C 45/53; B01F 5/02
[52] U.S. Cl. .......................... 425/4 R; 425/130; 425/200; 425/207; 425/557; 425/562; 425/817 R
[58] Field of Search .................... 425/4 R, 130, 425/207, 817 R, 200, 562, 557; 366/182

[56] References Cited

U.S. PATENT DOCUMENTS

| | | |
|---|---|---|
| 3,207,486 | 9/1965 | Rosenthal . |
| 3,773,298 | 11/1973 | Gebert . |
| 3,788,337 | 1/1974 | Breer . |
| 3,799,199 | 3/1974 | Rumpff . |
| 3,902,850 | 9/1975 | Lehnert . |
| 3,924,837 | 12/1975 | Knis et al. . |
| 3,964,731 | 6/1976 | Ernst . |
| 3,975,128 | 8/1976 | Schluter . |
| 4,070,008 | 1/1978 | Schlieckmann . |
| 4,082,512 | 4/1978 | Wingard et al. . |
| 4,092,118 | 5/1978 | Muhle . |
| 4,099,919 | 7/1978 | Leidal . |
| 4,115,066 | 9/1978 | Muhle . |
| 4,115,299 | 9/1978 | Muhle . |
| 4,129,636 | 12/1978 | Boden et al. . |
| 4,175,874 | 11/1979 | Schneider . |
| 4,189,070 | 2/1980 | Macosko et al. . |
| 4,314,963 | 2/1982 | Boden et al. . |
| 4,332,335 | 6/1982 | Fiorentini . |
| 4,350,650 | 9/1982 | Cereghini . |
| 4,399,105 | 8/1983 | Tilgner et al. . |
| 4,418,041 | 11/1983 | Johnson et al. . |
| 4,426,348 | 1/1984 | Salisbury . |
| 4,430,287 | 2/1984 | Tilgner . |
| 4,452,917 | 6/1984 | Proksa et al. . |
| 4,473,531 | 9/1984 | Macosko et al. . |
| 4,480,556 | 6/1989 | Reilly et al. . |
| 4,582,224 | 4/1986 | Proksa et al. . |
| 4,680,003 | 7/1987 | Schulte et al. . |
| 4,856,908 | 8/1989 | Hara et al. . |
| 4,881,890 | 11/1989 | Barry . |
| 5,082,437 | 1/1992 | Matsushita et al. . |
| 5,164,162 | 11/1992 | Ridenour . |
| 5,270,013 | 12/1993 | Decker . |

FOREIGN PATENT DOCUMENTS 2847504  5/1980  Germany .

Primary Examiner—Khanh P. Nguyen
Attorney, Agent, or Firm—Hudak & Shunk Co.

[57] ABSTRACT

A mixing head for a molding machine includes a mixing chamber into which reaction materials are injected from nozzles communicating therewith, toward a closed end of the chamber and at acute angles with respect to the longitudinal axis of the chamber, the angles' apexes lying toward the closed end. The streams of injected material impact and mix, before entering an area of turbulence between the closed end of the specifically dimensioned chamber, and the points of communication where they are preliminarily reacted. Subsequently the material leaves the chamber by passing back through the point of impact, effecting further mixing. The doubly mixed material thereafter proceeds to a discharge passageway prior to entering a mold. The path described, resulting from the angle at which the streams are injected into the chamber, together with the configuration of the chamber, and the double passage of the material through the point of impact, assures superior mixing and reaction of the material before its discharge into a receiving mold.

12 Claims, 2 Drawing Sheets

MIXING HEAD FOR MOLDING MACHINE

CROSS-REFERENCE

This application is a Continuation-in-Part of application Ser. No. 08/057,313, filed May 5, 1993, now abandoned entitled "Mixing Head for Molding Machine".

TECHNICAL FIELD

This invention relates to molding machines. More particularly, this invention relates to mixing heads for combining and thereafter dispensing reactive components into molds designed to receive the same. Specifically, this invention relates to mixing heads for molding machines that provide more homogeneous and complete mixtures as a consequence of the direction in which the reactive components are combined and mixed by being impacted at a specific angle prior to being introduced into, and temporarily held in a mixing chamber of particular configuration. Thereafter they are re-mixed by being passed through the impact point a second time before being dispensed into a desired mold.

BACKGROUND OF THE INVENTION

The process of dispensing heated plastic material into product molds has long been known in the plastics industry. In recent years, however, reaction molding, in the case of injection molding sometimes being referred to as Reaction Injection Molding, RIM, has become increasingly popular, in part due to the inherently shorter cycle times made possible through use of the technique. In RIM processes, for example, several components reactive with each other are combined in a mixing device or "head" immediately prior to their being introduced into a mold. The mixed material thereafter gels in the mold and forms the desired product.

The mixing head commonly takes the form of a housing in which a piston mounted within a conforming bore moves reciprocally back and forth during successive molding cycles, in turn forcing a rod mounted on the end of the piston to travel through a second bore in the housing. This latter bore constitutes a chamber in which the several components mix and begin reacting with each other prior to being discharged into, and shaped in a mold. Mixing heads of the type described can be used in conjunction with either injection-type, or open mold processes.

In one mixing head design, described for example in U.S. Pat. No. 4,332,335, two inlet nozzles are located directly opposite each other in the wall of the second bore; these discharge streams of reacted material toward each other along a common axis, thereby resulting in the mixing of the two components at their point of impact within the bore. The mixture is thereafter dispensed into an open mold, or alternatively, injected under pressure into the desired mold.

The reciprocal movement of the rod results in the sequential opening and closing of the inlet nozzle entry points communicating with the second bore. In one direction of rod travel, the nozzles remain in an open or bore-communicating mode, permitting the reactants to flow freely into the chamber and mix therein before being dispensed into the mold. In the rod's reverse travel direction, the reactive materials are blocked from entry into the chamber and recycled, while any residual material remaining in the bore chamber is simultaneously displaced by the rod into the mold.

The quality of the products thus molded, however, depends to an important degree on the quality of the mixing achieved in the chamber, poor mixing resulting in imperfectly combined, non-homogeneous mixtures that give rise to unreacted material. This manifests itself in products containing so-called "wet spots," i.e., portions of unreacted material, and also results in non-uniform gelling in the molds. As a consequence, it gives rise to objectionable soft or hard areas in the products produced, undesirably weakening them. In addition, it can detrimentally lengthen reaction times, cause slower cycle speeds, and further increase costs due to the higher incidence of rejects, as well as the increased processing times.

The problems of poor mixing are commonly encountered in the molding industry, and in fact it has even been suggested that "after-mixers" be incorporated in mixing head assemblies to remedy the problem. However, resorting to such an expedient adds to overall manufacturing expense, and the use of such devices can occasion premature gelling of the mixed material, resulting in excessive shutdowns of the production line for cleaning of the equipment in order to avoid plugging difficulties.

Among other suggestions for overcoming the problem of poor mixing, for example, is that involving the use of the device disclosed in U.S. Pat. No. 4,840,556. The device there taught involves the positioning of mixing plates across the orifices of the inlet nozzles through which the reactive components are introduced into the mixing chamber. This is said to create desirable turbulence, and therefore, better mixing. Such a design adds to the complexity of the device, however, as well as to the pressure drop across the nozzles. It might also increase the vulnerability of the nozzles to plugging, and thus would be objectionable from that standpoint as well.

In view of the preceding, therefore, it is a first aspect of this invention to provide an improved mixing head for a molding machine.

It is a second aspect of this invention to provide a mixing head for a molding machine in which superior mixing is achieved.

It is a further aspect of this invention to provide a mixing head for a molding machine in which injection nozzles direct reactant streams toward a closed end of the mixing chamber at an acute angle relative to the longitudinal axis of the chamber.

It is an additional aspect of the this invention to provide a mixing chamber for a molding machine mixing head having a ratio of chamber length to chamber diameter that assures improved mixing and optimum residence time for initial reaction.

It is another aspect of this invention to cause reactant streams mixed by their impact together in the mixing chamber of a reaction molding machine to be further mixed as a consequence of being thereafter again forced to pass through the turbulent point of impact of the streams, prior to being dispensed into a mold.

It is still a further aspect in one embodiment of this invention to provide a mixing head for a molding machine that avoids the necessity of partially closing the discharge passageway or installing downstream valves in order to assure complete interreaction of the reactive components.

It is yet another aspect of this invention to provide a mixing head for a molding machine that facilitates the mixing of reaction molding components without objectionable, unreacted wet spots.

BRIEF SUMMARY OF THE INVENTION

The preceding and still other aspects of the invention are provided by a mixing head for a reaction molding machine comprising a body; at least one movable piston; and a mixing chamber with two ends located within the body, the piston closing one end of the chamber and being movable through the chamber. The other end of the chamber communicates with a passageway through which contents of the chamber are discharged after mixing.

At least two injection nozzles enter the chamber at points of communication therewith, each of the injection nozzles being adapted to inject material into the chamber in the direction of the closed end, and at an acute angle relative to the chamber's longitudinal axis, the apex of the angle lying toward the closed end. The nozzles are positioned so that material injected therefrom impacts together at a point, being mixed in the process, and after preliminarily reacting in the mixing chamber, again passing through the impact point upon exiting the chamber, being mixed still further during the passage. The ratio of the chamber's length as measured along its longitudinal axis from the point of nozzle entry to the closed end, to the chamber's diameter is from about 1:1 to about 4:1.

The preceding and yet further aspects of the invention are provided by a mixing head for a molding machine comprising a body; first and second pistons; and a cylindrical mixing chamber having two ends, located within the body. One end of the chamber is closed by the first piston, which is movable through the chamber, and the other end of the chamber opens into a passageway through which contents of the chamber can be discharged and through which the second piston is movable.

Two injection nozzles enter into the chamber at points of communication therewith located substantially opposite each other, the injection nozzles being adapted to inject molding material into the chamber in the direction of the closed end, and at an acute angle relative to the longitudinal axis of the chamber, the apex of the angle lying in the direction of the closed end and the nozzles being positioned so that streams of molding material injected therefrom impact each other at a point within the chamber, being mixed in the process. After preliminarily reacting in the mixing chamber, the mixture is again forced to pass through the impact point upon exiting the chamber, being mixed still further. The ratio of the chamber's length as measured along its longitudinal axis from the points of communication to the closed end, to the chamber's diameter is from about 1:1 to about 4:1.

BRIEF DESCRIPTION OF THE DRAWINGS

The invention will be better understood when reference is had to the following drawings, in which like-numbers refer to like-parts, and in which.

DETAILED DESCRIPTION OF THE INVENTION

Figure 1:
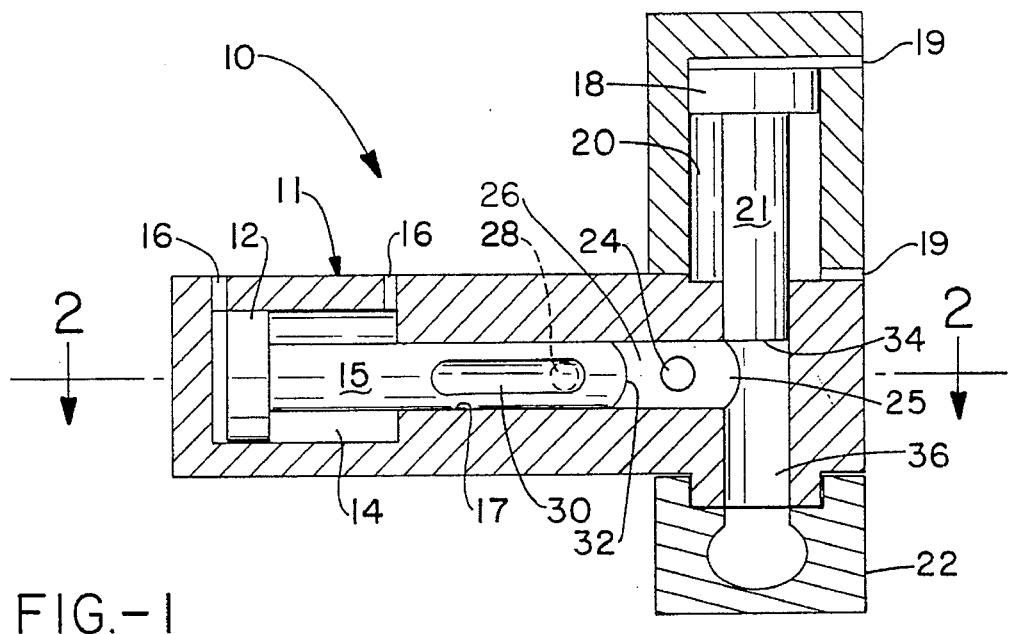
FIG. 1 is a semi-schematic, cross-sectional representation of the mixing head of the invention along its vertical axis, showing the head in its material-mixing mode.

FIG. 1 is a semi-schematic, cross-sectional representation of a mixing head of the invention along its vertical axis, showing the head in its mixing mode. As shown, the mixing head, generally 10, comprises a body 11 enclosing a mixing piston 12. The mixing piston reciprocates in a bore 14 within the body 11. The piston 12 also has a rod 15 extending therefrom within a second bore 17. The rod 15 has a face 32 on one end thereof, and recycle ducts 30 disposed on each side of the rod, better seen in FIG. 2. The bore 17 has at least two injection nozzles 24, also better seen in FIG. 2, communicating therewith through which molding materials, reactive with each other, are introduced into a mixing chamber 26 which is formed by a portion of the bore 17 when it is unoccupied by the mixing piston 12. The bore 17 communicates with a discharge passageway 36 in which a clean-out piston 18 reciprocates in a bore 20. The piston 18 also has a rod 21 attached thereto which serves as a clean-out implement for passageway 36. In the Figure, the discharge passageway 36 is disposed over an open mold 22 into which the mixed molding materials are introduced. Hydraulic oil ports 16 and 19, respectively, are positioned to receive hydraulic oil for the purpose of causing pistons 12 and 18 to reciprocate within their respective cylinders.

The functioning of the device involves the movement of clean-out piston 18 in an upward direction until rod face 34 is positioned above, or partially above discharge port 25. When clean-out piston 18 is in the position described, mixing piston 12 has moved to the left in the Figure in cylinder 14 causing the chamber 26 to be formed in bore 17 between the face 32 of rod 15, and the points at which nozzles 24 communicate with the bore. In this condition the head 10 is in its material-mixing mode and reactive components are introduced under pressure into mixing chamber 26 through injection nozzles 24, allowing them to impact and combine together, forming a mixture which is subsequently directed into the chamber where it is preliminarily reacted. Thereafter, the material is discharged through displacement by newly entering material back through the point of impact into discharge passageway 36 from where it is propelled into open mold 22.

After injection of the reacted materials through injection nozzles 24, rod 15 moves to the right causing the face 32 of the mixing piston to move through chamber 26, thereby displacing any residual material out of bore 17 into passageway 36. In this position, injection nozzles 24 communicate with recycle ports 28 through piston recycle ducts 30, allowing the reactive components to be continuously non-reactively recycled.

Following discharge of the contents of mixing chamber 26 as aforesaid, clean-out piston 18 proceeds in a downwardly direction within bore 20, causing rod 21, specifically its face 34 to proceed downward through discharge passageway 36, displacing any residual molding material from the passageway and forcing the same into mold 22. Having operated as described, the head is in condition to repeat the cycle.

One difficulty, previously described in the foregoing, which the mixing head of the invention is designed to overcome, is the tendency of mixing heads of the prior art to produce mixtures which contain unreacted material. Such material is detrimental to the quality of the product for the reason that unreacted material frequently is responsible for under-strength products, and undesirable softened or hardened areas.

In some devices similar to those described in the invention disclosed herein, such short-comings have typically been compensated for by lowering the face 34 of the clean-out piston so that it partially closes off the discharge port 25. This "choking" of the discharge port 25 results in higher velocity through the reduced opening, increasing turbulence and thereby promoting better mixing. Unfortunately, however, the part of the face 32 of the mixing piston 15 which encounters the blocked portion of the discharge port 25 eventually tends to develop a build-up of gelled material thereon. In time, this build-up becomes so thick that it tends to obstruct the injection nozzles 24 even when rod 15 is in its retracted or mixing position, preventing, or partially interfering with the entry of reactants from the nozzles into the chamber 26. Due to the superior mixing achieved by the invention disclosed herein, however, there is no need to choke the discharge port 25 with the clean-out rod 21, effectively avoiding the problem.

Figure 1A:
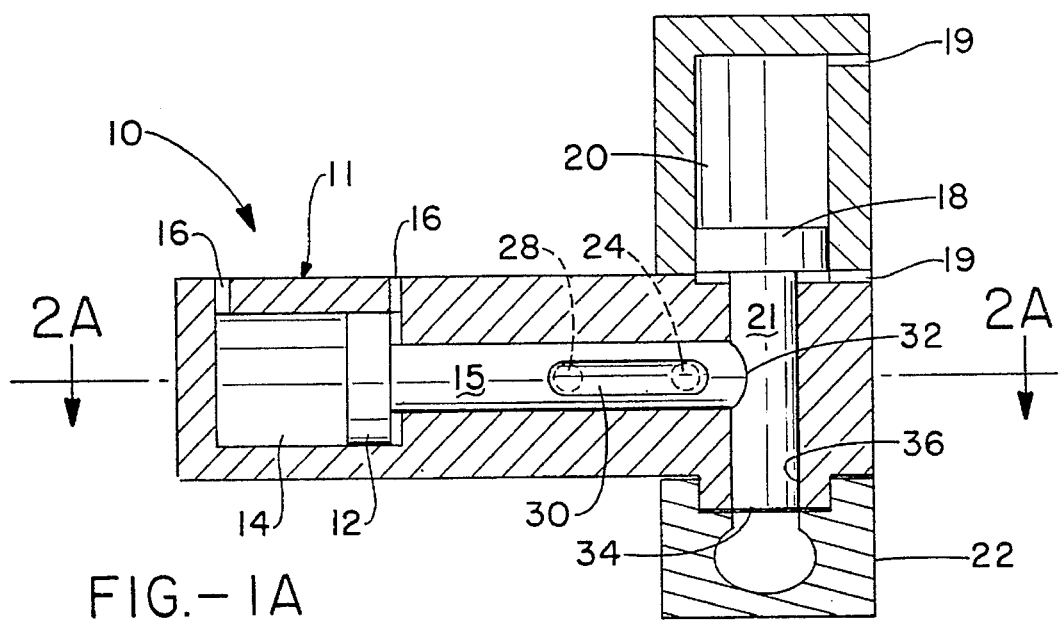
FIG. 1A is a semi-schematic, cross-sectional view of the mixing head as shown in FIG. 1 in which, however, the mixing head is illustrated in its material-recycling mode.

FIG. 1A is a semi-schematic, cross-sectional view as shown in FIG. 1, in which, however, the head is illustrated in its material-recycling mode. In the Figure, piston 12 has moved to the right within bore 14, causing the mixing face 32 of rod 15 to move forward to the point of its intersection with discharge passageway 36, thereby allowing communication of the injection nozzles 24 with recycle ports 28 through recycle ducts 30, a position in which any residual material formerly present in bore 17 has been forced into discharge passageway 36.

In the Figure, clean-out piston 18 is shown in the lower region of cylinder 20, a position in which rod 21 has been moved until its face 34 has traveled downwardly to its lower-most position, removing any remaining material from discharge passageway 36 and dispensing it into open mold 22. While other methods may be envisioned such as pneumatic-induced travel for moving the pistons 12 and 18 through their respective bores 14 and 20, the use of hydraulic fluids as previously described is particularly convenient.

Figure 2:
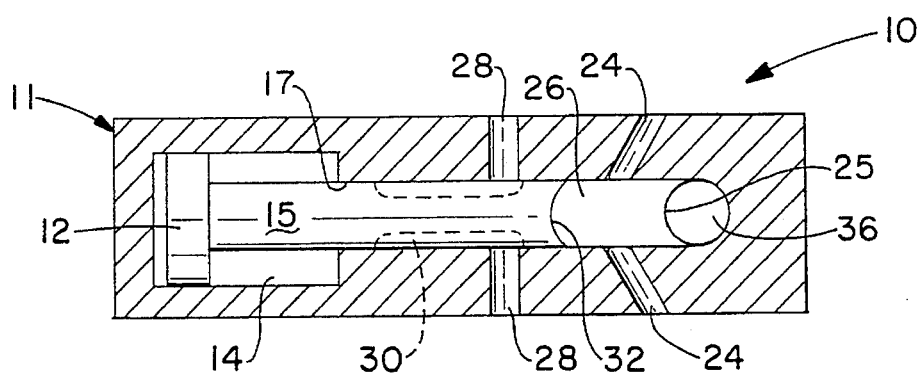
FIG. 2 is a semi-schematic, cross-sectional representation of the mixing head of FIG. 1, along line 2—2 of FIG. 1.

FIG. 2 is a semi-schematic, cross-sectional representation of the mixing head of FIG. 1, along line 2—2 of FIG. 1. As shown, the head 10 comprises a mixing piston 12 which reciprocates in bore 14, and which has a rod 15 extending therefrom. Rod 15 includes a concave face 32, configured to match the peripheral shape of discharge passageway 36. Bore 17, through which rod 15 travels intersects passageway 36 at discharge port 25. Again, rod 15 is provided with recycle ducts 30 which allow the communication of recycle ducts 28 with injection nozzles 24 when the mixing head 10 is in its recycle mode, shown in FIG. 2A.

Figure 3:
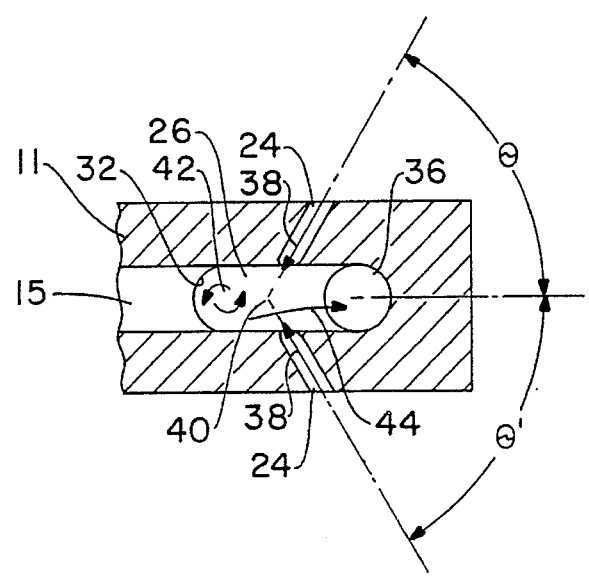
FIG. 3 is a partial, semi-schematic view of the mixing head of FIG. 2 showing the pattern of flow of the reactive components injected into the mixing chamber.

The Figure shows two important aspects of the invention, namely, the acute angle, illustrated more particularly in FIG. 3, at which the injection nozzles intersect the longitudinal axis of bore 17, and the substantial area of chamber 26, as defined by the area of bore 17 lying between piston face 32 in its mixing position, shown in the Figure, and the point of communication of injection nozzles 24 with bore 17.

With respect to the angle of the injection nozzles, applicant has found that when the streams of reactive material enter the chamber at acute angles relative to the longitudinal axis of the bore 17, adjustment of the injection pressure, i.e. the pressure at which the components enter the chamber 26 becomes far less critical than would otherwise be the case. In this regard, typically, entry pressures of the reactive components are adjusted from about 1,400 psig to 3,000 psig, depending upon the viscosity of the components, the amounts being mixed, and other considerations.

In many of the prior art devices in which the injection nozzles are located opposite each other, but which direct streams of components toward each other along a common axis, their functioning is undesirably sensitive to the magnitude of the pressure of the material exiting one nozzle, relative to the pressure of that leaving the other nozzle. In this regard, if the pressure difference is excessive, the higher pressure stream often has a tendency to meet and pass the other stream without being properly mixed therewith. Furthermore, the high pressure stream can produce "blocking" of the low pressure nozzle, preventing material from being introduced therefrom. A notable advantage of the instant invention, on the other hand, is that when the streams are mixed by impacting each other in an angular direction upon entry, and the mixed streams after being preliminarily reacted in the specifically dimensioned chamber are forced to subsequently pass back through the point of impact of the converging streams, superior "double" mixing is achieved even when there is a substantial disparity between the pressure of the material leaving one nozzle, compared to the pressure of the material being ejected from the other nozzle.

Ordinarily, the components being mixed in the head must be combined in particular ratios. This can be accomplished by adjusting the pressure of the material entering the chamber 26 from the injection nozzles 24. Reactant feed pressure can be controlled, for example, by needle valves, connected to the injection nozzles, not shown in the Figure.

Figure 2A:
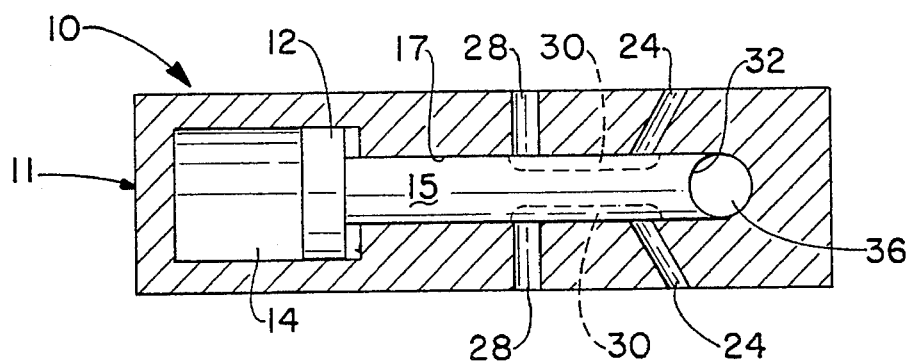
FIG. 2A is a semi-schematic, cross-sectional representation of the mixing head of FIG. 1A, along line 2A—2A of FIG. 1A.

FIG. 2A is a semi-schematic, cross-sectional representation of the mixing head of FIG. 1A, along line 2A—2A of FIG. 1A. In contrast to FIG. 2, which shows the mixing head 10 in its mixing mode, FIG. 2A illustrates the mixing head in its recycle mode. In the Figure, the mixing piston 12 has moved to the right in bore 14, positioning the recycle ducts 30 in rod 15 at a location allowing recycle ducts 28 to communicate with injection nozzles 24. In this position, material passing through injection nozzles 24 traverses recycle ducts 30, exiting through recycle ducts 28. In moving to the right in the Figure, the piston face 32 has cleaned residual material from bore 17, forcing it from the bore through discharge passageway 36. The advantage of recycling the reacted materials during the period in which they are not being mixed lies in the fact that the reacted materials are thereby maintained in a free-flowing condition, and are therefore instantly available when a new mixing cycle is initiated.

FIG. 3 is a partial, semi-schematic view of the mixing head of FIG. 2 showing the pattern of flow of the components injected into the mixing chamber.

The Figure illustrates a portion of the body 11 of the mixing head 10 in which rod 15 is disposed. The face 32 of the rod 15 closes one end of the two-ended mixing chamber 26, the other end of the bore 17 communicating with discharge passageway 36. Two injection nozzles 24 communicate with mixing chamber 26 at acute angles $\theta$ and $\theta'$, respectively, which are opposite and upstream from the end closed by face 32, relative to the longitudinal axis of the bore 17 from which the mixing chamber 26 is configured.

As shown in the Figure by the arrows 38, the streams of reactive components are injected toward the end of the mixing chamber 26, closed by face 32 of the piston rod 15. The streams converge within mixing chamber 26 at a point of impact 40. The angles of convergence θ and θ' of nozzles 24 with respect to the longitudinal axis of the bore 17, a portion of which comprises mixing chamber 26, being acute angles which impart a directional flow of the impacted streams toward the end of the mixing chamber, closed by the face 32. Not only does mixing take place at the point of impact, but in the area between the face 32 and the point of communication of the injection nozzles 24 with the mixing chamber 26, an area of turbulence 42 is formed which promotes good mixing of the reactive components and provides a residence time during which their preliminary interreaction can proceed. Following mixing, as described, the material, which is constantly being displaced by newly entering components, must exit the turbulence area 42 by again passing through the impact point 40 before reaching the discharge passageway 36. Thus, the subsequent re-entry of the mixed material into the impact point, in effect results in a double passage of the material through the point of impact of the converging streams, assuring thoroughly mixed and reacted components, substantially free from unreacted material.

With respect to the angle of convergence, it has been found that when the injected streams are forced to enter the chamber toward its closed end, the end closed by the rod 15 extending from mixing piston 12, at angles acute with respect to the longitudinal axis of the mixing chamber 26, the apex of the angles lying toward the closed end of the chamber, and the mixed materials are then forced to pass back through the point of impact of the mixing materials before leaving the mixing chamber, greatly superior mixing is achieved. In connection with such angles, it has been determined that the angle of each nozzle formed by each of their axis relative to the longitudinal axis of the mixing chamber 26, whose apex lies toward the closed end of the mixing chamber, should be between 30° to 65°; however, an angle of from about 55° to 60° is preferred.

The dimensions of the chamber 26 have also been determined to be important, and in conjunction with nozzles converging at the angle described, it has been found desirable to provide a mixing chamber 26 whose length as measured from the point of communication of injection nozzles 24 with the mixing chamber, to the end of the chamber formed by face 32, relative to the diameter of the mixing chamber, should be in the ratio of from about 1:1 to about 4:1. Such a ratio assures provision of an adequate residence time during which further mixing and preliminary reaction may take place before the mixed stream is passed through the point of impact 40 on its way to the discharge passageway 36. While the diameter of the chamber 26 may vary depending upon other dimensions of the head, commonly the diameter will be from about 5 to 25 mm.

It is desirable that the injection nozzles 24 be positioned substantially opposite each other as shown in the Figure, although the angles at which each is directed into the chamber may be different, if desired, providing they form acute angles within the range described, capable of providing the desired impact point through which the material must exit upon leaving the chamber 26. Such variance is sometimes desirable, for example, when the material being injected from each of the nozzles has a different viscosity. The orifices of the injection nozzles may also be varied within fairly broad limits; however, typically the orifices will range from about 0.35 to 7 mm. More than two nozzles may also be employed to accommodate the injection of more than two reactive components, the nozzles being spaced apart in the mixing chamber, for instance, along a peripheral line coinciding with a transverse plane intersecting the chamber, at substantially right angles thereto.

Figure 4:
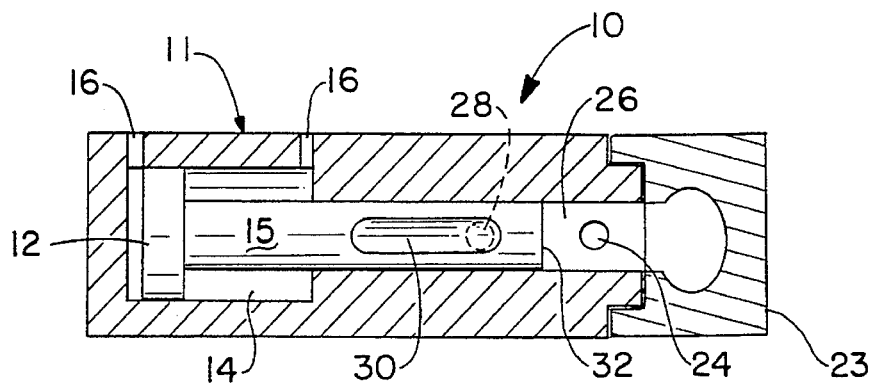
FIG. 4 is a semi-schematic view of another embodiment of the mixing head of the invention along its vertical axis, showing the head in its mixing mode.

FIG. 4 is a semi-schematic view of still another embodiment of the mixing head of the invention along the vertical axis, showing the head in its mixing mode.

In the embodiment of the invention shown in FIG. 1, it will be observed that the mixing piston 12 is disposed at substantially right angles to the clean-out piston 18. While this arrangement has certain advantages, it has also been found that the invention is susceptible to the "in-line" configuration shown in FIG. 4. In the Figure, the mixing head 10 comprises a mixing piston 12 reciprocating in bore 14, with a rod 15 extending therefrom containing recycle ducts 30. As shown, the face 32 of rod 15 has been moved to the left allowing reactive material to enter the mixing chamber 26 through injection nozzles 24. In this position, the recycle ducts 30 which form part of rod 15 are inoperative. Following mixing, in the clean-out phase, rod 15 moves to the right, not illustrated, forcing any remaining material from the mixing chamber 26 into mold 23. While the mold 23 is shown connected to the mixing head 10 in FIG. 4, as it would be in the case of injection molding, the mixing head 10 could be oriented along a vertical axis, downwardly, and the mixed material dispensed into an open mold. Furthermore, while the embodiment shown in the other Figures is illustrated in connection with open molds, such embodiment also has application to injection molding processes.

The embodiment of the invention shown in FIG. 4 has a number of notable advantages including the fact that it requires only a single piston, and the mixed material being discharged from mixing chamber 26 provides a smooth flow into the mold 23 by virtue of the fact that the discharging, mixed material is not forced to change axial direction as in the case of the embodiment illustrated in the other Figures, in which the material is required to undergo a 90° change in direction before entering the mold.

While in accordance with the patent statutes, a preferred embodiment and best mode has been presented, the scope of the invention is not limited thereto, but rather is measured by the scope of the attached claims.

What is claimed is:

1. A mixing head comprising:

a body;

at least one movable piston;

a mixing chamber having two ends located within said body, one end of said chamber being closed by a piston movable through said chamber, the other end opening into a passage way through which contents of said chamber are discharged;

at least two injection nozzles entering said chamber at points of communication therewith, located on a common circumference of said chamber, each of said injection nozzles being adapted to inject reactive material into said chamber in the direction of said closed end and at an acute angle of from about 30° to 65° relative to the chamber's longitudinal axis, the apex of said angle lying toward said closed end, said nozzles being positioned so that material injected therefrom impacts together at a point within said chamber, being forced to exit said chamber through said point of impact, and wherein the ratio of said chamber's length as measured along its longitudinal axis from said points of communication on said circumference, to said closed end, to the chamber's diameter, is from about 1:1 to about 4:1.

2. A mixing head according to claim 2, in which said angle for each of the nozzles is substantially the same.

3. A mixing head according to claim 1, in which the longitudinal axis of said passageway extends from, and is in line with the longitudinal axis of said mixing chamber.

4. A mixing head according to claim 1, in which the longitudinal axis of said chamber and that of said passageway are disposed substantially at right angles to each other.

5. A mixing head according to claim 1, in which the piston closing said one end of said chamber is movable through said chamber from a mixing position in which said nozzles inject said material into said chamber, to a position in which said piston substantially occupies said chamber and said material is recycled.

6. A mixing head for a reaction molding machine comprising:

a body;

first and second pistons;

a cylindrical mixing chamber having two ends located within said body, one end of said chamber being closed by said first piston which is movable through said chamber, the other end opening into a passageway through which contents of said chamber are discharged and through which said second piston is movable;

two injection nozzles entering said chamber at points of communication therewith located substantially opposite each other, said injection nozzles each being adapted to inject reactive molding material into said chamber in the direction of said closed end at an acute angle of from about 30° to 65° relative to the longitudinal axis of said chamber, the apex of said angle lying toward said closed end, said nozzles being positioned so that streams of molding material injected therefrom impact together at a point within said chamber, being forced to exit said chamber through said point of impact, and wherein the ratio of said chamber's length as measured along its longitudinal axis from said points of communication to said closed end, to the chamber's diameter, is from about 1:1 to about 4:1.

7. A mixing head according to claim 6, wherein said first piston moves between a mixing position in which said molding material enters said mixing chamber through said nozzles, and a position in which said molding material is recycled.

8. A mixing head according to claim 7, in which said recycling occurs through means comprising molding material outlet ports communicating with said chamber together with means for connecting said nozzles with said ports.

9. A mixing head according to claim 8, in which said connecting means comprises ducting in said first piston, connecting said nozzles with said ports.

10. A mixing head according to claim 6, in which said longitudinal axis of said passageway extends from, and is in line with the longitudinal axis of said mixing chamber.

11. A mixing head according to claim 6, in which said chamber and said passageway are disposed substantially at right angles to each other.

12. A mixing according to claim 11, in which said second piston is positioned in said passageway and is movable therethrough.

* * * * *